United States Patent
Jeddeloh (10) Patent No.: US 6,684,304 B2
(45) Date of Patent: *Jan. 27, 2004

(54) METHOD TO ACCESS MEMORY BASED ON A PROGRAMMABLE PAGE LIMIT

(75) Inventor: Joseph M. Jeddeloh, Minneapolis, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/239,911

(22) Filed: Jan. 29, 1999

(65) Prior Publication Data

US 2002/0078298 A1 Jun. 20, 2002

(51) Int. Cl.[7] ............................................. G06F 12/00
(52) U.S. Cl. ..................... 711/159; 711/170; 711/172; 711/133
(58) Field of Search .................... 711/170–173, 5, 711/202, 203, 206, 208, 209, 159, 133, 136, 160; 710/10; 713/2

(56) References Cited

U.S. PATENT DOCUMENTS

| | | | | |
|---|---|---|---|---|
| 4,035,778 A | * | 7/1977 | Ghanem | 711/133 |
| 4,047,243 A | * | 9/1977 | Dijkstra | 711/206 |
| 4,745,541 A | | 5/1988 | Vaniglia et al. | 700/12 |
| 4,937,791 A | * | 6/1990 | Steele et al. | 365/230.03 |
| 4,970,648 A | * | 11/1990 | Capots | 360/5 |
| 5,193,172 A | * | 3/1993 | Arai et al. | 709/104 |
| 5,414,658 A | * | 5/1995 | Challa | 365/185.06 |
| 5,450,558 A | * | 9/1995 | Ludwig | 711/203 |
| 5,465,337 A | * | 11/1995 | Kong | 711/206 |
| 5,517,643 A | * | 5/1996 | Davy | 709/105 |
| 5,579,508 A | * | 11/1996 | Yoshizawa et al. | 709/104 |
| 5,606,685 A | * | 2/1997 | Frandeen | 711/117 |
| 5,727,178 A | * | 3/1998 | Pletcher et al. | 707/202 |
| 5,748,551 A | | 5/1998 | Ryan et al. | 365/230.03 |
| 5,784,699 A | * | 7/1998 | McMahon et al. | 711/171 |
| 5,802,341 A | * | 9/1998 | Kline et al. | 711/209 |
| 5,802,605 A | * | 9/1998 | Alpert et al. | 711/208 |
| 5,825,878 A | * | 10/1998 | Takahashi et al. | 713/190 |
| 5,848,025 A | | 12/1998 | Marietta et al. | 365/238.5 |

(List continued on next page.)

OTHER PUBLICATIONS

Intel, "Intel 440BX AGP set: 82443BX Host Bridge/Controller" Datasheet, entirety, Apr. 1998.*
David A Patterson & John L. Hennessey, "Computer Architecture A Quantative Approach" second edition, Morgan Kaufmann Pub. pp 439–466, 1996.*
Keith Diefendorff, Jalapeno Powers Cyrix's M3, Microdesign Resources, Microprocessor Report, pp. 24–30 (Nov., 1998).
Inventor, Joseph M. Jeddeloh, U.S. patent application No. 09/240,526; Filed Jan. 29, 1999, entitled "Device to Access Memory Based on a Programmable Page Limit".
Inventor, Joseph M. Jeddeloh, U.S. patent application No. 09/240,526; Office Action Mailed Jul. 2, 2001.

*Primary Examiner*—Hong Kim
(74) *Attorney, Agent, or Firm*—Trop, Pruner & Hu, P.C.

(57) ABSTRACT

A method to establish a page limit for use by a memory control device during memory access operations includes establishing a page limit value, receiving a memory access request, and performing a memory access operation in accordance with the established page limit and the memory access request. The established page limit may be a fixed number or it may depend upon the number of banks in the memory and/or the type of service provided by a computer system. The established page limit may also vary during computer system operations in response to memory access characteristics such as page miss and/or hit rates.

29 Claims, 5 Drawing Sheets

U.S. PATENT DOCUMENTS

| | | | |
|---|---|---|---|
| 5,889,714 A | 3/1999 | Schumann et al. | 365/203 |
| 6,009,019 A * | 12/1999 | Fang | 365/189.02 |
| 6,052,134 A * | 4/2000 | Foster | 345/533 |
| 6,052,756 A | 4/2000 | Barnaby et al. | 711/105 |
| 6,078,994 A * | 6/2000 | Carey | 711/133 |
| 6,085,296 A * | 7/2000 | Karkhanis et al. | 711/147 |
| 6,182,089 B1 * | 1/2001 | Ganapathy et al. | 707/206 |
| 6,189,062 B1 * | 2/2001 | Jander et al. | 710/129 |
| 6,233,661 B1 * | 5/2001 | Jones et al. | 711/154 |
| 6,247,107 B1 * | 6/2001 | Christie | 711/216 |
| 6,260,129 B1 * | 7/2001 | Crockett et al. | 710/52 |
| 6,275,917 B1 * | 8/2001 | Okada | 711/170 |
| 6,408,371 B1 * | 6/2002 | Jeddeloh | 711/159 |

* cited by examiner

METHOD TO ACCESS MEMORY BASED ON A PROGRAMMABLE PAGE LIMIT

RELATED APPLICATIONS

This application is related to U.S. patent application Ser. No. 09/240,526, entitled "Device to Access Memory Based on a Programmable Page Limit," filed on Feb. 1, 1999.

BACKGROUND

The invention relates to computer system memory architectures and, more particularly, to the control of memory access operations based on a memory page cache configured to provide a programmable number of open pages.

Many current computer system memory architectures use synchronous random access memories (synchronous RAM) such as synchronous dynamic random access memory (SDRAM), SyncLink dynamic random access memory (SLDRAM), and Rambus dynamic random access memory (RDRAM). The SyncLink standard has been assigned the tentative designation of IEEE-1596.7 by the Microprocessor & Microcomputer Standards Committee (MMSC) of the Institute of Electrical and Electronics Engineers (IEEE). The Rambus® standard is published by Rambus, Incorporated of Mountain View, Calif.

In addition to providing inherently faster operation than previous types of memories, synchronous RAM may generally be organized into banks. Banks represent a physical compartmentalization of memory space, where each bank may correspond to a unit or array of physical memory. A bank may be further divided into pages, where a page is typically defined in terms of a row address. All those memory locations in a bank having a common row address are said to be on the same page of memory.

Figure 1:
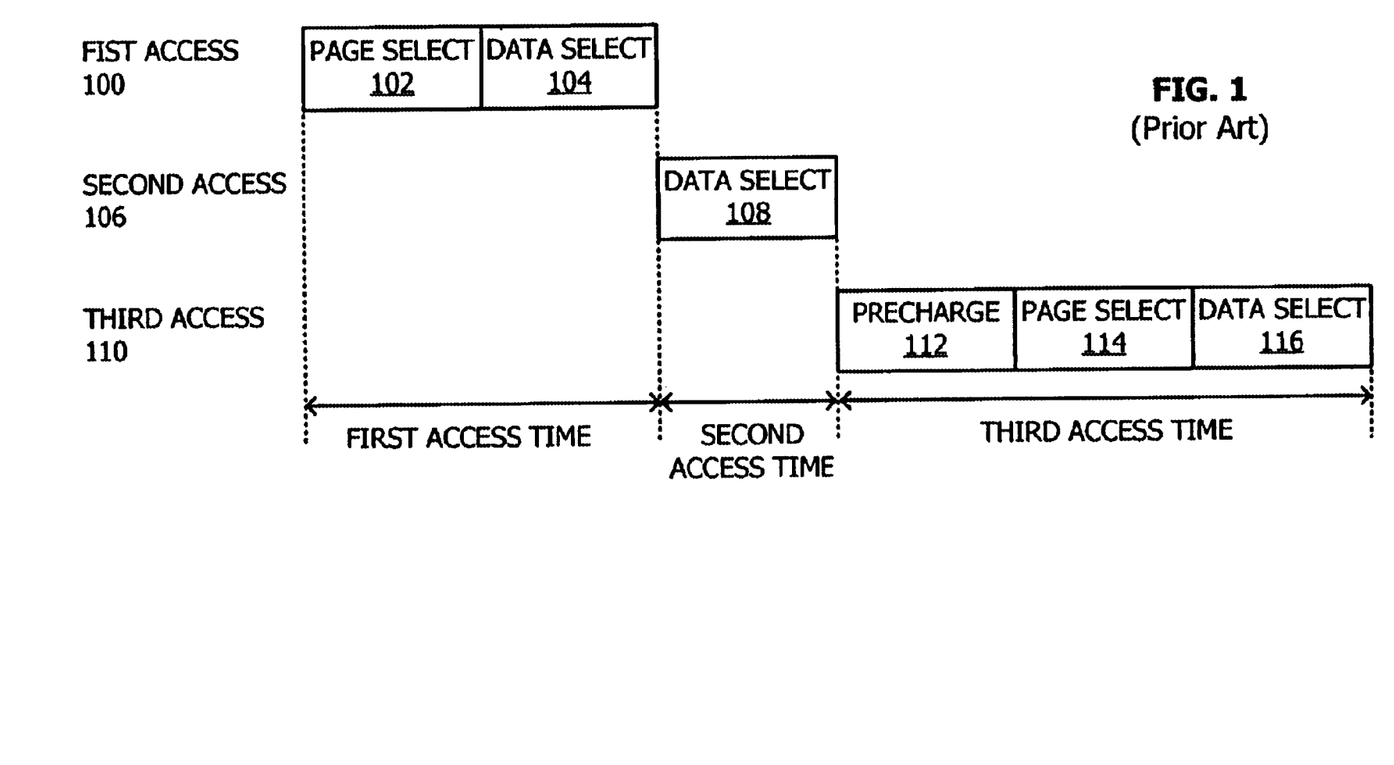
FIG. 1 shows an illustrative series of memory access operations to a common bank of memory.

One feature of banked memory systems is that consecutive memory access operations to a common page may be performed faster than consecutive memory access operations directed to different pages within the same bank. As shown in FIG. 1, the time to perform first access 100 (directed to a first page in a first bank) includes the time needed to select the target page 102 and the time to select the uniquely targeted memory location 104. If second access 106 is directed to another memory location in the same page, the time required to complete the memory transfer includes that needed to select the target location 108; no time is required for page selection. If a subsequent, third access 110 is directed to a different page in the same bank however, the previously selected (open) page must be closed (an operation referred to as precharging 112) before access 110 may proceed. Following precharge operation 112, access 110 continues through page selection 114 and data selection 116 phases. Because precharge operations require some time to complete, they generally limit the speed with which a sequence of memory access operations may be performed.

As indicated above, by leaving a page open after completing a memory access operation the precharge time penalty may be avoided when a subsequent bank access is directed to that same page (a page hit). Conversely, when a subsequent bank access is to a different page (a page miss), the open page must be closed and the precharge operation performed before the memory access operation may proceed. Thus, while there exists benefits to leaving a page open in the event there are frequent page hits, there also exists time penalties associated with a large number of page misses when pages are kept/left open.

As the number of banks in a memory system increases, the potential for improved memory access bandwidth increases. The potential improvement may generally be attributed to two factors: (1) the ability to avoid precharge when making successive accesses to a common page of memory; and (2) the ability to hide precharge by interleaving memory accesses between different banks. Actual improvement in memory system performance, however, may be less than expected. For example, as the number of memory banks increase so does the amount of hardware needed to track each open page. Thus, the hardware overhead associated with maintaining a large number of pages in the open state may set a practical upper limit on the number of pages that may be simultaneously open. Further, some applications and devices are known to exhibit low degrees of memory access locality—memory access operations by these types of entities do not generally benefit, and may actually slow overall access operations due to frequent page misses. Thus, there is a need for memory systems having improved performance.

SUMMARY

In one embodiment, the invention provides a method by which a memory control device may establish a page limit for use during memory access operations in a computer system having a banked memory architecture. The method includes establishing a page limit value (representing a number of pages that may be kept in an open state at one time), receiving a memory access request, and performing a memory access operation in accordance with the established page limit value and the memory access request. The act of establishing a page limit value may comprise obtaining the page limit value from a user modifiable memory. The act of establishing a page limit value may also comprise determining the number of banks in the computer memory, and setting the page limit value to a fraction of the determined number of banks. The method may be stored in any media that is readable and executable by a programmable control device.

DETAILED DESCRIPTION

In a computer system having a banked memory architecture, a programmable number of memory pages may be simultaneously maintained in the open state. The number of pages so maintained may be a function of the total number of banks in the memory, a user specified value, the type of processing performed by the computer system, or it may dynamically and automatically change during the course of system operations. Memory access operations in accordance with the invention may provide improved memory system performance for those entities (software and hardware)

issuing localized memory requests, by keeping one or more pages (to which the localized memory requests are directed) in an open state. Memory access techniques in accordance with the invention may also close those pages that are not experiencing localized access requests.

Figure 2:
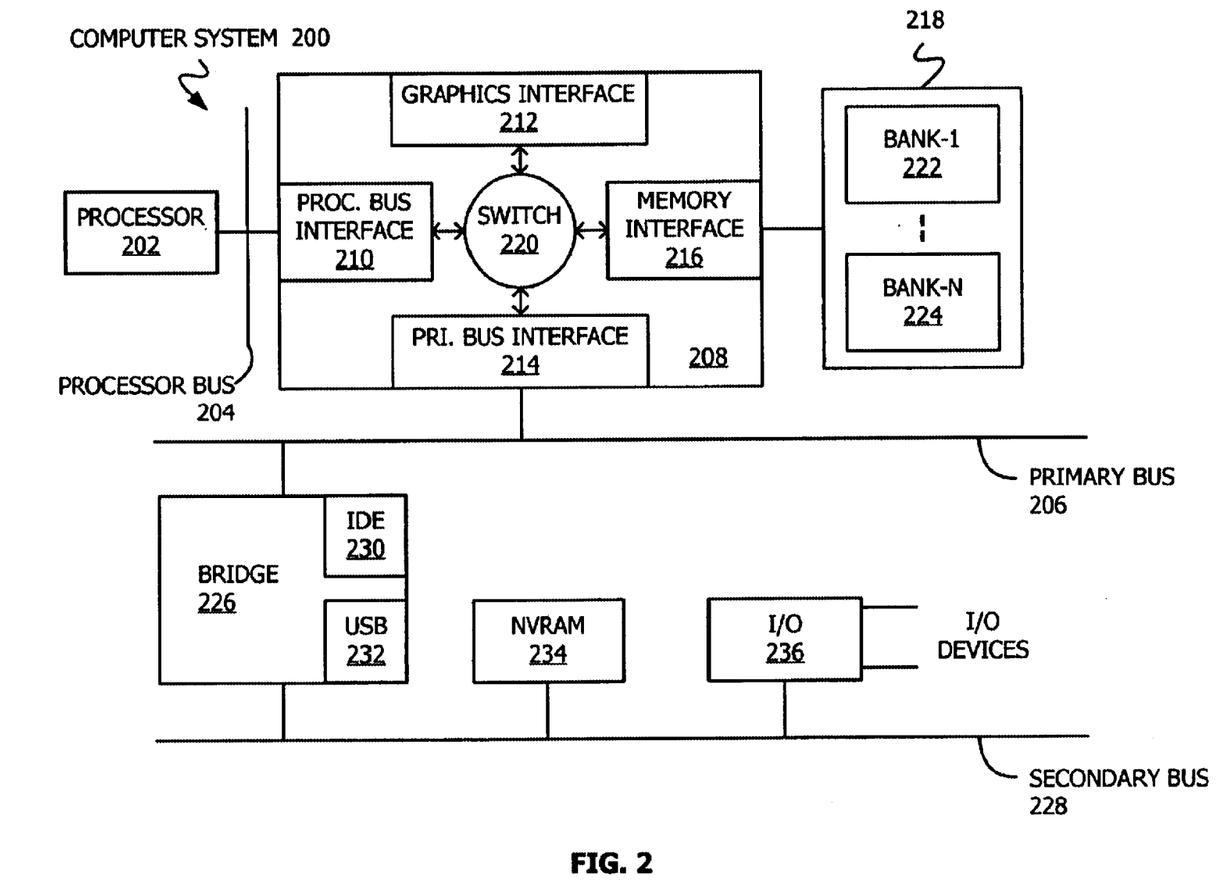
FIG. 2 shows a computer system having a banked memory architecture in accordance with one embodiment of the invention.

FIG. 2 shows computer system 200 having a banked memory architecture in accordance with one embodiment of the invention. As shown, computer system 200 includes host processor 202 coupled to processor bus 204 which, in turn, is coupled to primary bus 206 through bridge circuit 208. Host processor 202 may be any type of general or special purpose processor including multiple processors. Processor bus 204 may be any type of communication channel suitable for coupling host processor 202 to other computer system devices. An illustrative primary bus conforms to the Peripheral Component Interface (PCI) specification.

Bridge circuit 208 may include processor bus interface 210 for communicating with processor bus 204, graphics port interface 212 for communicating with one or more graphics devices (not shown), primary bus interface 214 for communicating with primary bus 206, memory interface 216 for communicating with system memory 218, and switch 220. An illustrative graphics port interface 212 conforms to the Accelerated Graphics Port (AGP) specification. Switch 220 may be any type of switching mechanism that may selectively couple each of the interfaces 210, 212, 214, and 216. System memory 218 may be any type of RAM organized into a plurality of banks. For example, bank-1 222 through bank-N 224. In some embodiments, each bank (e.g., bank-1 222) may include a plurality of memory devices or chips.

Bridge circuit 226 may couple primary bus 206 to secondary bus 228 while also providing Intelligent Drive Electronics (IDE) interface 230 for communicating with IDE devices (not shown) and Universal Serial Bus (USB) interface 232 for communicating with USB devices (not shown). Typically, secondary bus 228 also provides a mechanism to couple system non-volatile random access memory (NVRAM) 234 and a variety of input-output (I/O) devices such as parallel and serial ports through I/O circuit 236 to computer system 200. Illustrative secondary buses include those buses conforming to the Industry Standard Architecture (ISA) and Extended Industry Standard Architecture (EISA) specifications.

Figure 3:
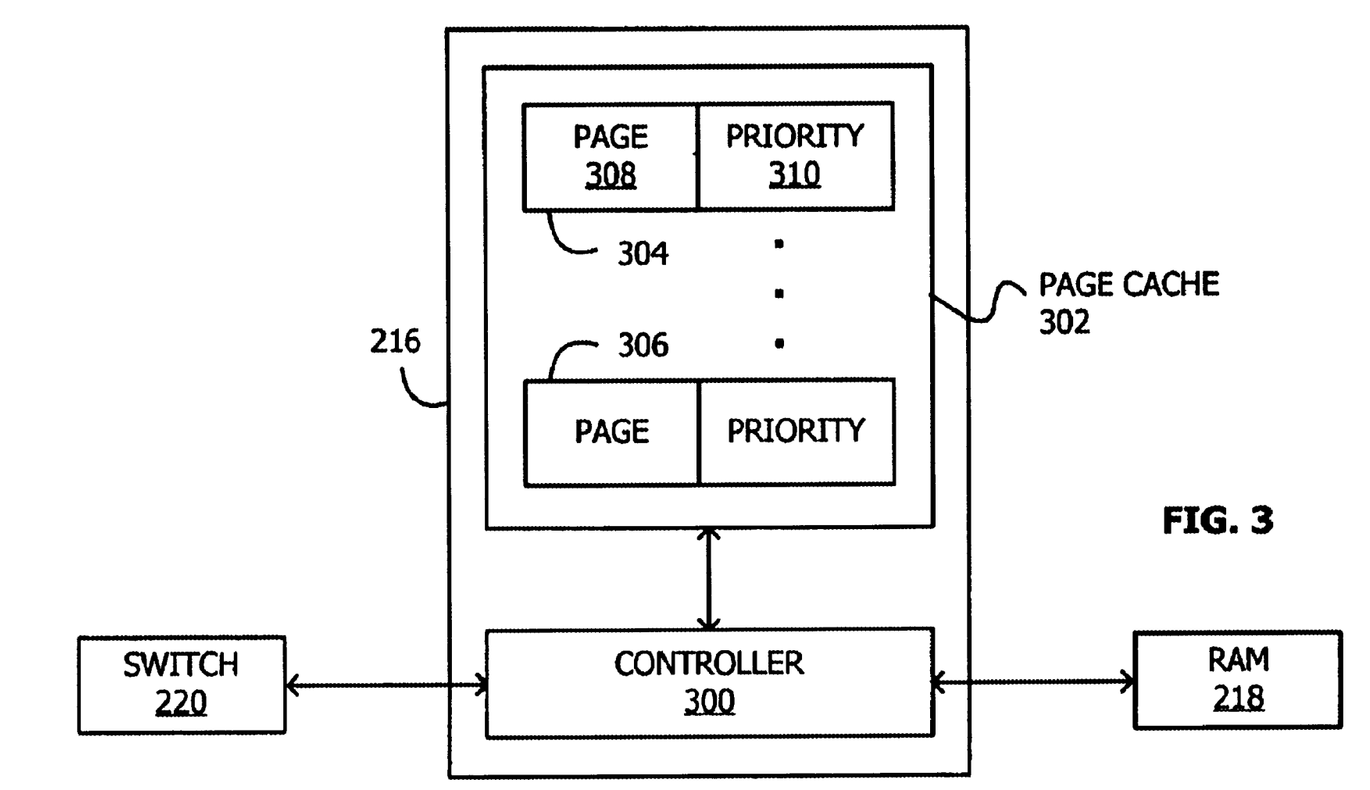
FIG. 3 shows a simplified block diagram of a memory controller in accordance with one embodiment of the invention.

Referring to FIG. 3, memory interface 216 in accordance with one embodiment of the invention comprises controller 300 and page cache 302. Page cache 302, in turn, includes a plurality of page entries (304 and 306, for example). In general, page cache 302 includes one page entry for each page that may be simultaneously maintained in an open state. By way of example, if system memory 218 includes 24 banks, and controller 300 is configured to maintain a maximum of 18 simultaneously open pages, cache table 302 includes 18 page entries. As indicated, a page entry (e.g., 304) includes page field 308 and priority field 310. The contents of page field 308 identifies a page in system memory 218 that may be maintained in an open state. The contents of priority field 310 provides an indication of the page's priority vis à vis maintaining the page in the open state. In one embodiment, priority field 310 may provide an indication of how long it has been since the page (identified by page address field 308) was last accessed. This information may be used by controller 300 to implement a least recently used (LRU) cache page replacement protocol. In another embodiment, priority field 310 may provide a last-used indication for use in a round-robin cache page replacement protocol.

Figure 4:
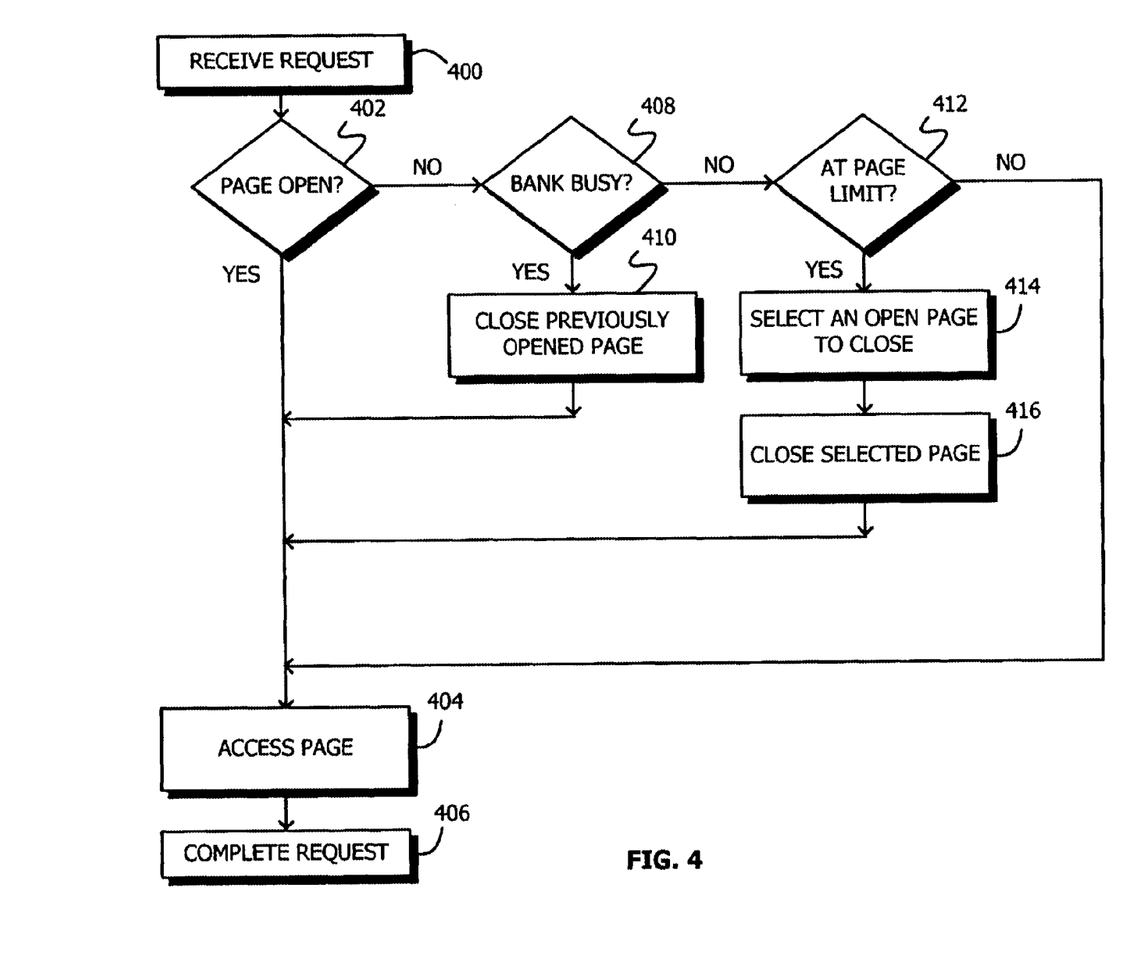
FIG. 4 shows a flowchart for one method in accordance with the invention to process a memory access request.

Referring to FIG. 4, a method to process a memory access request in accordance with one embodiment of the invention is shown. Initially, controller 300 receives a memory access request (block 400). If the page associated with the access request (hereinafter, the requested page) is already open (the 'yes' prong of diamond 402), the page is accessed (block 404) and the memory access request is completed (block 406). If the requested page is not open (the 'no' prong of diamond 402), a check is made to determine if the bank within which the requested page exists (hereinafter, the requested bank) already has an open page. If the requested bank has an open page (the 'yes' prong of diamond 408), the requested bank's currently opened page is closed (block 410) and processing continues at block 404. If the requested bank does not have an open page (the 'no' prong of diamond 408), controller 300 determines if the total number of open pages is equal to the currently specified maximum number of simultaneously open pages (page limit, see discussion below). If the number of pages currently open is equal to the specified page limit (the 'yes' prong of diamond 412), controller 300 selects a currently open page to close (block 414), closes the selected page (block 416), and continues processing the memory request at block 404. Alternatively, acts in accordance with blocks 414 and 416 may be performed in reverse order. That is, block 416 followed by 414. If the number of pages currently open is less than the currently specified page limit (the 'no' prong of diamond 412), processing continues at block 404.

Figure 5:
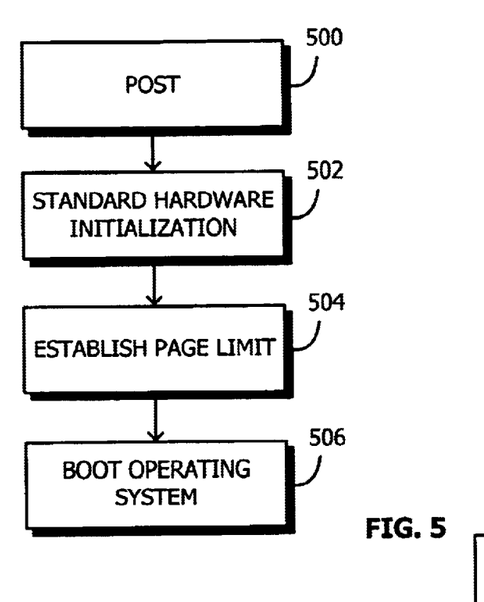
FIG. 5 shows a flowchart for establishing a page limit in accordance with one embodiment of the invention.

In one embodiment, the page limit may be established at computer system startup and/or as part of a system reset operation. Referring to FIG. 5 for example, on computer system 200 startup a series of system checks may be performed (block 500). System checks are generally performed by basic input-output system (BIOS) instructions and are collectively referred to as power-on self test (POST) routines. Typically, POST processing checks system components such as memory, disk storage units, and any expansion cards for proper functioning. Once the BIOS verifies that system components are functioning properly, additional BIOS routines may initialize various components (block 502). In addition to initializing other system components, BIOS may also establish a page limit for controller 300 (block 504). Following device initialization and establishment of a page limit, BIOS typically initiates an boot sequence that results in an operating system controlling computer system operations (block 506).

In one embodiment, BIOS may obtain a fixed page limit value (e.g., the value 6) from NVRAM 234 and route it to controller 300 via bridge circuit 208. In another embodiment, BIOS may obtain a value from NVRAM 234 representing the fraction or percentage of banks that may simultaneously have an open page (hereinafter a fraction value). For example, if system memory 218 includes 16 banks, and the fraction value is 0.5 (e.g., 50%), then controller 300 may establish a page limit of 8. In those implementations in which the page limit is described in terms of a fraction value, controller 300 must also obtain information regarding the number of banks in system memory. In one embodiment, controller 300 may directly interrogate system memory. In another embodiment, controller 300 may assume a fixed value that may have been set at the time computer system 200 was manufactured. In yet another embodiment, BIOS may obtain this information during POST processing and provide it to controller 300. In still another embodiment, controller 300 may obtain a page limit value directly—that is, controller 300 may obtain a page limit value (represented in terms of a fixed value or a fraction value) from a predetermined memory (e.g., NVRAM 234).

BIOS routines are typically stored in nonvolatile memory 234. Illustrative nonvolatile memories include read only memory (ROM), electrically programmable read only memory (EPROM), electrically erasable programmable read only memory (EEPROM), and flash memories. Parameters such as the page limit value (fixed or fractional) may also be stored in a nonvolatile memory. In one embodiment, page limit information may be stored in the same nonvolatile memory as the BIOS. In another embodiment, a user modifiable nonvolatile memory such as complementary metal oxide semiconductor (CMOS) memory may be used. In the latter case, a user may modify the page limit value (fixed or fractional) through a system setup application.

Figure 6:
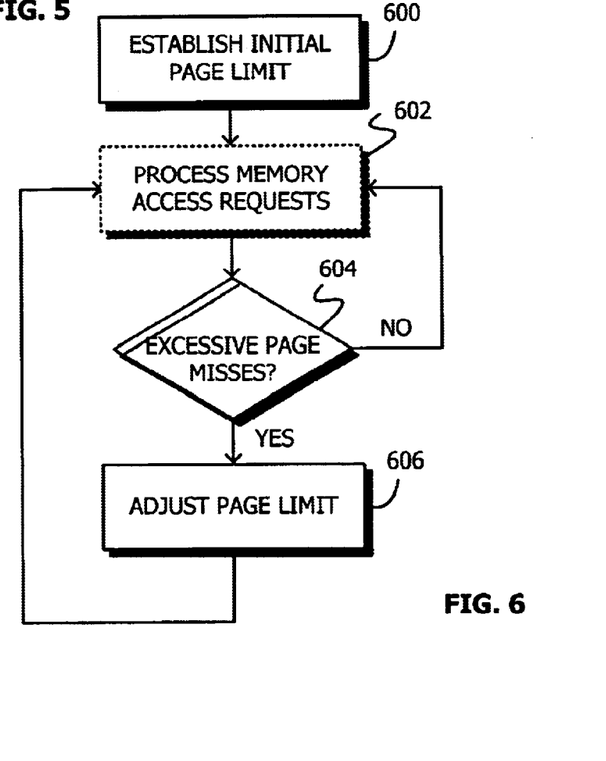
FIG. 6 shows a flowchart for one method in accordance with the invention to dynamically vary a memory controller's page limit.

Referring to FIG. 6, a page limit value may also be periodically adjusted during system operations. An initial page limit may be established as described above (block 600). Following a sequence of memory access operations (block 602), controller 300 determines if an excessive number of page misses have occurred. If a larger than specified number of page misses have occurred within a designated time period (the 'yes' prong of diamond 604), the page limit may be increased (block 606) with memory access operations continuing at block 602. Alternatively, if the page miss rate remains above a specified value after the open page limit has been increased, the number of pages concurrently maintained in the open state may be subsequently decreased. (A large page miss rate even with a relatively large number pages maintained in the open state may indicate a random memory access pattern. In this case it may be more beneficial, from a memory performance stand point, to close a page after each access operation.) If, on the other hand, a larger than specified number of page misses have not occurred within a designated time period (the 'no' prong of diamond 604), memory access operations continue without an adjustment of the page limit (block 602). In one embodiment, controller 300 may increase the page limit if the page miss rate generated during memory access operations (block 602) exceeds 5% to 15%. In another example, controller 300 may adjust the number of pages based on the type of entity issuing memory requests and the current page miss rate. For example, if the entity requesting memory access is one that generally exhibits poor locality (e.g., a processor), controller 300 may increase the page limit if the page miss rate exceeds 15% to 20%. If the entity requesting memory access is one that generally exhibit high locality (e.g., an I/O process), however, controller 300 may increase the page limit if the page miss rate exceeds 5% to 10%.

Various changes in the components, circuit elements, as well as in the details of the illustrated operational methods are possible without departing from the scope of the claims. For instance, a page limit value may be based on the type of processing performed by a computer system. For example, if computer system 200 provides file server services, one page limit (specified in terms of a fixed value or a fractional value) may be selected while if computer system 200 provides application server services, another page limit (specified in terms of a fixed value or a fractional value) may be selected. Typically, file servers exhibit a higher degree of locality in their memory access requests than do application servers. Thus, it may be beneficial to specify a higher page limit for a file server than for an application server having the same memory architecture (e.g., number of banks). Indication of the type of service provided by computer system 200, in addition to the fixed or fractional page limit value, may be stored in a nonvolatile memory and may be obtained directly by controller 300 or provided to controller 300 from, for example, a BIOS routine.

In addition, page cache 302 may be implemented using dedicated hardware registers or a conventional memory dedicated for use by controller 300. In either case, page cache 302 may include a as few as two page entries or as many page entries as there are banks in system memory 218. (It will be recognized by those of ordinary skill that in a page cache whose page entries are implemented via hardware registers, methods in accordance with FIGS. 5 and 6 may not generally increase the page limit above the maximum available number of page entries.)

Further, system memory 218 may comprise any banked memory architecture, comprising synchronous or non-synchronous random access memory. Moreover, some or all acts in accordance with FIGS. 4, 5, and 6 may be performed by a custom designed state machine (embodied in a gate array or an application specific integrated circuit or ASIC, for example) or a programmable control device executing instructions organized into one or more program modules. A programmable control device may be a computer processor, and storage devices suitable for tangibly embodying program instructions include system memory as well as all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been illustrated with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to access computer memory having a plurality of banks, each bank having a plurality of pages, the method comprising:

establishing a programmable page limit value representing a maximum number of the plurality of pages that may be kept in an open state at one time;

receiving a memory access request; and performing a memory access operation in accordance with the established page limit value and the memory access request.

2. The method of claim 1, wherein the act of establishing comprises obtaining the page limit value from a user modifiable memory.

3. The method of claim 2, wherein the act of obtaining comprises receiving the page limit value from a basic input-output routine.

4. The method of claim 1, wherein the act of establishing comprises:

determining the number of banks in the computer memory; and setting the page limit value to a fraction of the determined number of banks.

5. The method of claim 4 wherein the act of setting comprises:

obtaining a fraction value; and setting the page limit value to a whole number approximately equal to the product of the number of banks in the computer memory and the obtained fraction value.

6. The method of claim 1 wherein the act of setting comprises:
obtaining a first value if a determined type of service is a first type and a second value if the determined type of service is a second type; and
setting the page limit value to the obtained value.

7. The method of claim 1, wherein the act of setting comprises:
determining the number of banks in the computer memory; and
setting the page limit value to a whole number approximately equal to the product of the obtained value and the number of banks in the computer memory.

8. The method of claim 1, wherein the act of performing a memory access operation comprises:
determining if opening a page indicated by the memory request will exceed the established page limit and, if it will, selectively closing a page currently in the open state;
opening the page indicated by the memory request; and
completing the memory access operation.

9. The method of claim 8, wherein the act of selectively closing a page is performed in accordance with a specified replacement policy.

10. The method of claim 9, wherein the specified replacement policy comprises a least recently used replacement policy.

11. The method of claim 10, wherein a specified value of the page miss rate is approximately 50%.

12. The method of claim 11, wherein the act of adjusting the page limit value comprises setting the page limit value to 1.

13. The method of claim 1, wherein the maximum number of the plurality of pages that may be kept in an open state at one time comprises a number less than the total number of pages of the plurality of banks.

14. A method to access computer memory having a plurality of banks, each bank having a plurality of pages, the method comprising:
establishing a programmable page limit value representing a number of the plurality of pages that may be kept in an open state at one time, the act of establishing comprising determining a type of service provided by a computer system and setting the page limit value based on the determined type of service;
receiving a memory access request; and
performing a memory access operation in accordance with the established page limit value and the memory access request.

15. The method of claim 14, wherein the act of obtaining comprises receiving the page limit value from a basic input-output routine.

16. The method of claim 14, wherein the act of setting comprises:
obtaining a first value if the determined type of service is a first type and a second value if the determined type of service is a second type; and
setting the page limit value to the obtained value.

17. The method of claim 1, wherein the act of setting comprises:
determining the number of banks in the computer memory; and
setting the page limit value to a whole number approximately equal to the product of the obtained value and the number of banks in the computer memory.

18. The method of claim wherein the act of performing a memory access operation comprises:
determining if opening a page indicated by the memory request will exceed the established page limit valve and, if it will, selectively closing a page currently, in the open state;
opening the page indicated by the memory request; and
completing the memory access operation.

19. The method of claim 14, wherein the maximum number of the plurality of pages that may be kept in an open state at one time comprises a number less than the total number of pages of the plurality of banks.

20. A method to access computer memory having a plurality of banks, each bank having a plurality of pages, the method comprising:
establishing a programmable page limit value representing a number of the plurality of pages that may be kept in an open state at one time, the act of establishing comprising determining a number of banks in the computer memory and setting the page limit value in response to the determination;
receiving a memory access request; and
performing a memory access operation in accordance with the established page limit value and the memory access request.

21. The method of claim 20, wherein the act of obtaining comprises receiving the page limit value from a basic input-output routine.

22. The method of claim 20, wherein the act of setting comprises:
obtaining a fraction value; and
setting the page limit value to a whole number approximately equal to the product of the number of banks in the computer memory and the obtained fraction value.

23. The method of claim 20, wherein the act of performing a memory access operation comprises:
determining if opening a page indicated by the memory request will exceed the established page limit value and, if it will, selectively closing a page currently in the open state;
opening the page indicated by the memory request; and
completing the memory access operation.

24. The method of claim 20, wherein the maximum number of the plurality of pages that may be kept in an open state at one time comprises a number less than the total number of pages of the plurality of banks.

25. A method to access computer memory having a plurality of banks, each bank having a plurality of pages, the method comprising:
establishing a programmable page limit value representing a number of the plurality of pages that may be kept in an open state at one time;
adjusting the page limit value if a page miss rate is above a specified value;
receiving a memory access request; and
performing a memory access operation in accordance with the established page limit value and the memory access request.

26. The method of claim 25, wherein the specified value of the page miss rate is approximately 50%.

27. The method of claim 25, wherein the act of adjusting the page limit value comprises setting the page limit value to 1.

28. The method of claim 25, wherein the act of performing a memory access operation comprises:

determining if opening a page indicated by the memory request will exceed the established page limit and, if it will, selectively closing a page currently in the open state;

opening the page indicated by the memory request; and completing the memory access operation.

29. The method of claim 25, wherein the maximum number of the plurality of pages that may be kept in an open state at one time comprises a number less than the total number of pages of the plurality of banks.

* * * * *

UNITED STATES PATENT AND TRADEMARK OFFICE
CERTIFICATE OF CORRECTION

PATENT NO. : 6,684,304 B2
DATED : January 27, 2004
INVENTOR(S) : Joseph M. Jeddeloh It is certified that error appears in the above-identified patent and that said Letters Patent is hereby corrected as shown below:

<u>Column 8,</u>
Line 1, after "claim" insert -- 14 --.

Signed and Sealed this

Thirtieth Day of March, 2004

JON W. DUDAS
*Acting Director of the United States Patent and Trademark Office*